(12) United States Patent
Chung

(10) Patent No.: US 6,872,163 B2
(45) Date of Patent: Mar. 29, 2005

(54) PLANETARY WHEELEND

(75) Inventor: I-Chao Chung, Troy, MI (US)

(73) Assignee: AxleTech International IP Holdings, LLC, Troy, MI (US)

( * ) Notice: Subject to any disclaimer, the term of this patent is extended or adjusted under 35 U.S.C. 154(b) by 38 days.

(21) Appl. No.: 10/624,037

(22) Filed: Jul. 21, 2003

(65) Prior Publication Data

US 2005/0020400 A1 Jan. 27, 2005

(51) Int. Cl.[7] .............................................. F16H 57/08
(52) U.S. Cl. .................................................... 475/331
(58) Field of Search ........................... 301/109, 124–1, 301/126, 131, 105.1; 475/331

(56) References Cited

U.S. PATENT DOCUMENTS

| 2,142,787 A | 1/1939 | Higbee | 180/22 |
|---|---|---|---|
| 2,154,497 A | 4/1939 | Durham | 188/18 |
| 2,182,560 A | 12/1939 | Higbee | 280/96.1 |
| 2,206,216 A | 7/1940 | Ash | 280/96.1 |
| 2,210,572 A | 8/1940 | Durham | 180/22 |
| 2,576,258 A | 11/1951 | Marsh | 301/36 |
| 4,986,608 A * | 1/1991 | Fett | 301/124.1 |
| 5,560,687 A * | 10/1996 | Hagelthorn | 301/105.1 |

* cited by examiner

*Primary Examiner*—Dirk Wright
(74) *Attorney, Agent, or Firm*—Howard & Howard

(57) ABSTRACT

A wheelend end assembly for a vehicle includes a support structure such as an axle housing. A spindle is secured to the support structure preferably by fasteners. The spindle has a generally centrally located bore receiving an output shaft that is rotatable relative to the spindle about an axis. A planetary gear set is coupled to the output shaft. A wheel hub is arranged about the outside of the spindle and is supported thereon by first and second bearings. A retainer, which may include a nut and lock washer, is secured to a threaded end of the spindle adjacent to the outer bearing for axially positioning the bearings relative to the spindle to retain the wheel hub on the spindle. Wheels are secured to a mounting flange on the wheel hub. The wheels define a track centerline that is preferably located between the bearings.

9 Claims, 1 Drawing Sheet

PLANETARY WHEELEND

TECHNICAL FIELD

The invention relates to a wheelend end for a vehicle, and more particularly, the invention relates to a wheelend end assembly having a planetary gear set and drive axle.

BACKGROUND OF THE INVENTION

Many wheelend end assembly configurations are used for both on and off highway applications. For off-highway applications, such as forestry vehicles, planetary gear sets at each wheelend end are often used to multiply the torque available. The planetary gear sets are typically packaged within a spindle or are arranged external to the spindle at the end of the wheelend end. Configurations with externally packaged planetary gear sets have constrained the size of the wheels that may be used. That is, a large wheel must be used to fit over the diameter of the planetary gear set at the end of the wheelend end. From another perspective, the planetary gear set diameter is limited by the smallest predicted wheel. Furthermore, existing configurations cannot easily adapt different brakes including drum, dry-disc, shaft-speed wet disc and wheel-speed wet disc types.

The bearing arrangements of prior art wheelend ends have been undesirable because the wheel hub mounting flange to which the wheels are attached has been located at an axial distance from the bearings requiring larger bearings than would otherwise be necessary. The bearings are located internal to the spindle to support the output shaft. Since the output shaft axis is rigidly supported, additional stress is placed on the planetary gear set due to manufacturing tolerances within the gear system that cannot be accommodated by the planetary spider which is attached to the rigidly supported output shaft. Moreover, the wheel hubs have lacked flexibility to change the wheel track center and diameter from application to application without major changes to the design of the wheelend end.

Furthermore, the bearing retaining nuts have typically been subject to loosening over time. In the prior art, the nuts are secured adjacent to a wheelend end member splined to the spindle, which places a preload on the bearings. During normal vehicle operation, the splined member rotates back and forth relative to the spindle thereby tending to loosen the nut. A very robust nut locking system is required to prevent this safety related failure mode.

Therefore, what is needed is a wheelend end that has flexibility in wheel size and mounting flange location, uses a bearing configuration that supports the wheel hub more efficiently, has a bearing retainer that does not loosen over time, a support system that optimizes load share in the planetary gear set, and the ability to mount different brake systems.

SUMMARY OF THE INVENTION AND ADVANTAGES

The present invention provides a wheelend end assembly for a vehicle having a support structure. A spindle is secured to the support structure and has a generally centrally located bore. An output shaft is received within the bore and is rotatable relative to the spindle about an axis. A wheel hub is arranged about the outside of the spindle and is supported thereon by first and second bearings. A bearing retainer, which may include a nut and washer, is secured to a threaded end of the spindle adjacent to one of the first and second bearings for axially positioning the bearings relative to the spindle to retain the wheel hub on the spindle.

In addition, the present invention provides wheels secured to a mounting flange on the wheel hub. The wheels define a track centerline that is preferably located between the bearings.

Accordingly, the above invention provides a wheelend end assembly that has flexibility in wheel hub mounting flange location while using a bearing configuration that better supports the wheel hub. Furthermore, a bearing retainer is utilized that does not loosen over time.

BRIEF DESCRIPTION OF THE DRAWINGS

Other advantages of the present invention can be understood by reference to the following detailed description when considered in connection with the accompanying drawing wherein the FIGURE depicts one embodiment of the present invention wheelend.

DETAILED DESCRIPTION OF THE PREFERRED EMBODIMENT

Figure 1:
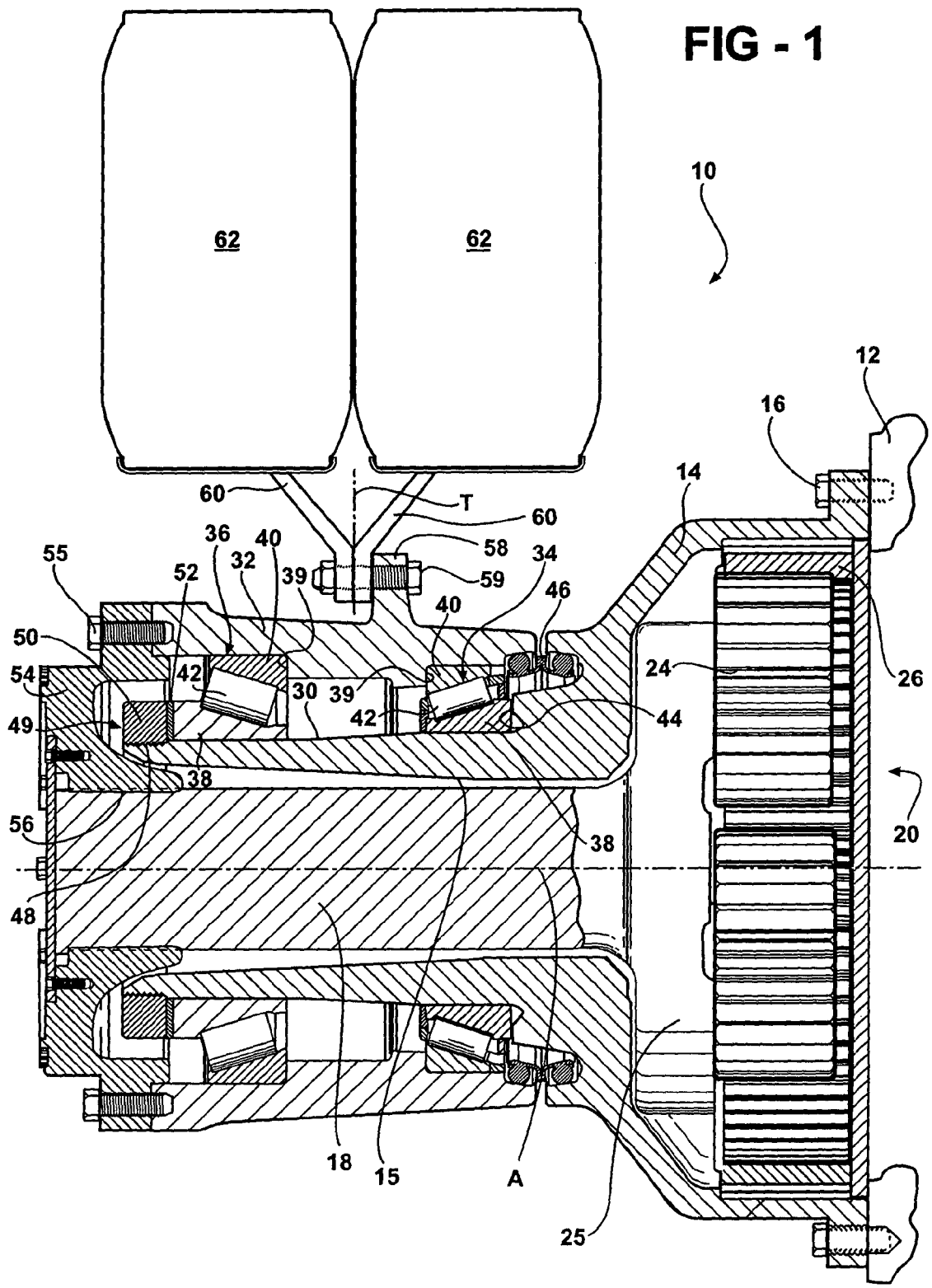

A wheelend end assembly 10 is shown in the FIGURE. The assembly 10 includes a support structure 12 having a spindle 14 secured thereto by a plurality of fasteners 16. The spindle 14 has a central bore 15 with an output shaft 18 arranged therein. The output shaft 18 receives rotational drive from a power source through a planetary gear set 20 to rotationally drive the wheels about an axis A. The planetary gear set 20 is mounted inboard of the spindle 14. It should be appreciated that the flow of power through the planetary gear set 20 may be arranged in any suitable manner known in the art. Typically a ring gear 26 is held stationary, input is from a sun gear, and output is through planetary gears 24 and a planetary spider 25. The spider 25 may be integral to the output shaft 18 as shown. The ring gear 26 may be sandwiched between the spindle 14 and support structure 12, thus external to the spindle 14.

A brake assembly, such as a shaft-speed wet disc brake assembly, a wheel-speed wet disc brake assembly, drum brakes, or dry-disc brakes, may be coupled to the sun gear, output shaft 18, wheel hub 32, or any other rotating component of the assembly 10 to apply a braking torque to the wheels. The brake assembly may be located internally or externally to the spindle 14. For example, shaft-speed wet disc brakes would be mounted inboard of the planetary gear set 20 while wheel-speed wet disc brakes, drum brakes, or dry-disc brakes would be mounted outboard between the spindle 14 and wheel hub 32. The configuration of the subject wheelend end assembly 10 provides great flexibility in mounting different types of brake assemblies.

The spindle 14 has an external surface 30 supporting first 34 and second 36 bearings that support a wheel hub 32. The bearings 34, 36 include inner races 38 pressed to the spindle 14 and outer races 40 pressed to the wheel hub 32 and supported by rollers 42 on the inner races 38. The inner race 38 of the interiorly located first bearing 34 is seated against a shoulder 44 on the spindle 14 to receive a preload from a bearing retainer 49. The outer races 40 are seated against shoulders 39 in the hub 32. A seal 46 is arranged between the hub 32 and the spindle 14 to retain oil between the hub 32 and spindle 14 while preventing debris from entering an axle compartment. The spindle 14 has a threaded end 48 for receiving the bearing retainer 49, which is preferably a nut 50 and a lock washer 52. The bearing retainer 49 is secured to an end of the spindle 14 adjacent to one of the first 34 and second 36 bearings for axially positioning the bearings 34, 36 relative to the spindle 14. Preferably, the nut 50 is tightened to force the washer 52 against the inner race 38 of the second bearing 36 to preload the bearings 34, 36. In the prior art, the nut is typically secured to a member splined to the spindle. During forward and reverse motion of the wheels about the spindle, the spline member rotates or chucks about the spindle. This chucking motion induces high frictional torsion that may cause the nut to loosen from the spindle, thereby reducing the preload on the bearings and eventually causing wheels to fall off. The positioning of the bearing retainer 49 and the absence of chucking motion in the present invention eliminates the possibility of the nut 50 loosening with a simple nut locking system. Alternatively, the bearing retainer 49 may be a plate bolted to the spindle 14 by multiple fasteners.

A hub driver 54 is interconnected between the output shaft 18 and the wheel hub 32. The hub driver 54 may be secured to the hub 32 by fasteners 55 and splined to the output shaft 18 at a splined end 56. The hub driver 54 may alternatively be integrally formed with the hub 32 or output shaft 18.

The bearing configuration of the present invention provides a rather large distance between the bearings 34, 36 to better support the wheel hub 32. The bearing arrangement provides flexibility in locating a wheel hub flange 58 that is used to support at least one wheel 60 and tire 62 on the hub 32. Preferably, there are a pair of wheels 60 and tires 62. Further, the bearing configuration optimizes load share in the planetary gear set 20 and provides flexibility to mount different brake systems. The wheels 60 and tires 62 are shown schematically for illustrative purposes. Typically, the pair of wheels 60 are secured to the wheel hub flange 58 by fasteners 59. Location of the wheel hub flange 58 between the bearings 34, 36 enables a wheel track centerline T to be located between the bearings 34, 36 so that smaller bearings may be used since the wheel track centerline T is not outside of the bearings 34, 36 introducing a greater load on the bearings 34, 36. The diameter and axial location of the wheel hub flange 58 may be easily changed from application to application by providing a separate wheel hub for the particular application. However, the present invention wheelend design enables flexibility while still providing a generally common design between the applications.

Unlike many prior art bearing configurations, the output shaft 18 and planetary spider 25 are not rigidly supported by bearings, which allows the planetary gears 24, mounted on the spider 25, to float relative to the ring gear 26. In particular, the output shaft 18 is supported by the hub driver 54 and is otherwise unsupported in the bore 15 of the spindle 14 to allow the floating of the planetary gears 24 and spider 25. This accommodates manufacturing tolerances within the planetary gear set 20 to permit load sharing among the planetary gears 24.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A wheelend end assembly for a vehicle comprising:
    a support structure;
    a spindle secured to said support structure with said spindle having a bore;
    an output shaft received within said bore and rotatable relative to said spindle about an axis;
    a planetary gear set coupled to said output shaft to multiply torque to said output shaft;
    a wheel hub disposed about said spindle and supported thereon by first and second bearings; and
    a bearing retainer secured to an end of said spindle adjacent to one of said first and second bearings for axially positioning said bearings relative to said spindle.

2. The assembly according to claim 1 wherein each of said first and second bearings include inner races in engagement with said spindle and outer races in engagement with said wheel hub.

3. The assembly according to claim 2 wherein said wheel hub includes a flange with at least one wheel secured to said flange.

4. The assembly according to claim 3 wherein said wheels define a track centerline with said track centerline arranged between said first and second bearings.

5. The assembly according to claim 2 wherein said bearing retainer includes a nut threadingly secured to an end of said spindle with a lock washer arranged between said nut and one of said inner races.

6. The assembly according to claim 1 further including a hub driver secured between said output shaft and said wheel hub to transmit rotational drive from said output shaft to said wheel hub.

7. The assembly according to claim 1 wherein said output shaft is unsupported in said bore of said spindle with said output shaft secured to a planetary spider of said planetary gear set.

8. The assembly according to claim 1 wherein said planetary gear set is arranged internal to said spindle proximate to said support structure.

9. The assembly according to claim 1 further including a brake assembly located between said planetary gear set and said support structure.

* * * * *